(12) United States Patent
Li

(10) Patent No.: US 7,796,382 B1
(45) Date of Patent: Sep. 14, 2010

(54) STYLUS EJECTING MECHANISM FOR PORTABLE ELECTRONIC DEVICE

(75) Inventor: Chang-Zhi Li, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 12/568,794

(22) Filed: Sep. 29, 2009

(30) Foreign Application Priority Data

Mar. 19, 2009 (CN) .................... 2009 1 0300966

(51) Int. Cl.
*G06F 1/16* (2006.01)
*G06F 3/033* (2006.01)

(52) U.S. Cl. .................... 361/679.58; 361/679.26; 361/679.55; 178/19.01; 345/179

(58) Field of Classification Search ................ 361/679.01–679.45, 679.55–679.59; 178/19.01; 345/179, 156, 157, 168, 169; 312/223.1, 312/223.2
See application file for complete search history.

(56) References Cited

U.S. PATENT DOCUMENTS

| 6,129,430 | A  | * | 10/2000 | Wu ........................ 312/223.2 |
| 6,410,865 | B1 | * | 6/2002 | Liu et al. ................ 178/19.01 |
| 7,576,980 | B2 | * | 8/2009 | Lin ........................ 361/679.56 |
| 2002/0003532 | A1 | * | 1/2002 | Huat ........................ 345/179 |

* cited by examiner

*Primary Examiner*—Jayprakash N Gandhi
*Assistant Examiner*—Nidhi Desai
(74) *Attorney, Agent, or Firm*—Steven M. Reiss

(57) ABSTRACT

A stylus ejecting mechanism includes a housing, a control mechanism, a driving mechanism and a stylus. The housing defines a cavity and forming a latching portion. The control mechanism includes a button, the button forms a projection, the button engaging with the latching portion. The stylus is received in the cavity, the stylus defines a groove. The projection is engaged in the groove for releasably locking the stylus, and the driving mechanism is positioned at one end of the stylus for ejecting the stylus from the cavity of the housing.

7 Claims, 6 Drawing Sheets

STYLUS EJECTING MECHANISM FOR PORTABLE ELECTRONIC DEVICE

BACKGROUND

1. Technical Field

The present disclosure relates to stylus ejecting mechanisms, and more particularly to a stylus ejecting mechanism for portable electronic device (e.g., mobile phones).

2. Description of Related Art

With the recent development of the technology of information processing, portable electronic devices such as mobile phones and personal digital assistants (PDAs) are now in widespread use. The portable electronic device generally has a large screen and the screen is typically pressure-sensitive. A stylus is used as an input device for writing, marking, or engraving on the pressure-sensitive screen.

In some electronic devices, the stylus is mounted to/into a housing of a given electronic device. The housing of the electronic device has a deep hole defined, e.g., in one sidewall thereof. An extending direction of the hole is substantially parallel to the sidewall. The stylus is substantially a thin and long pole. The stylus is received in the hole of the housing by friction therebetween and may be pulled out manually from the hole. However, the stylus may not easily be pulled out when the friction between the stylus and the housing is very large.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present stylus ejecting mechanism for portable electronic device. Moreover, in the drawings, like reference numerals designate corresponding parts throughout the several views, in which.

DETAILED DESCRIPTION

Figure 1:
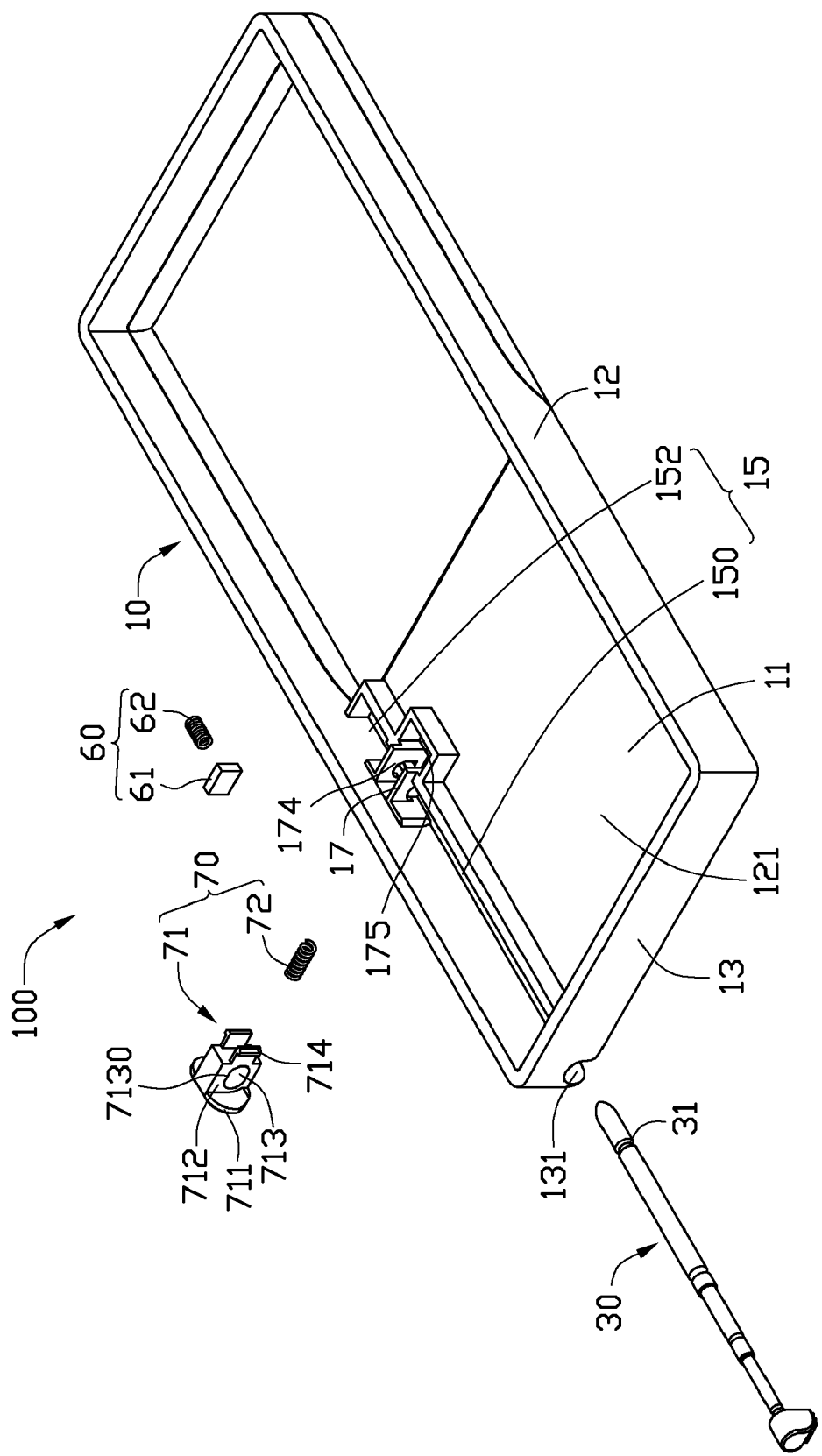
FIG. 1 is an exploded, isometric view of an exemplary stylus ejecting mechanism used for portable electronic device.

FIG. 1 shows an exemplary embodiment of a stylus ejecting mechanism 100 used to a portable electronic device, such as a mobile phone. The stylus ejecting mechanism 100 includes a housing 10, a stylus 30, an driving mechanism 60 and a control mechanism 70.

Figure 2:
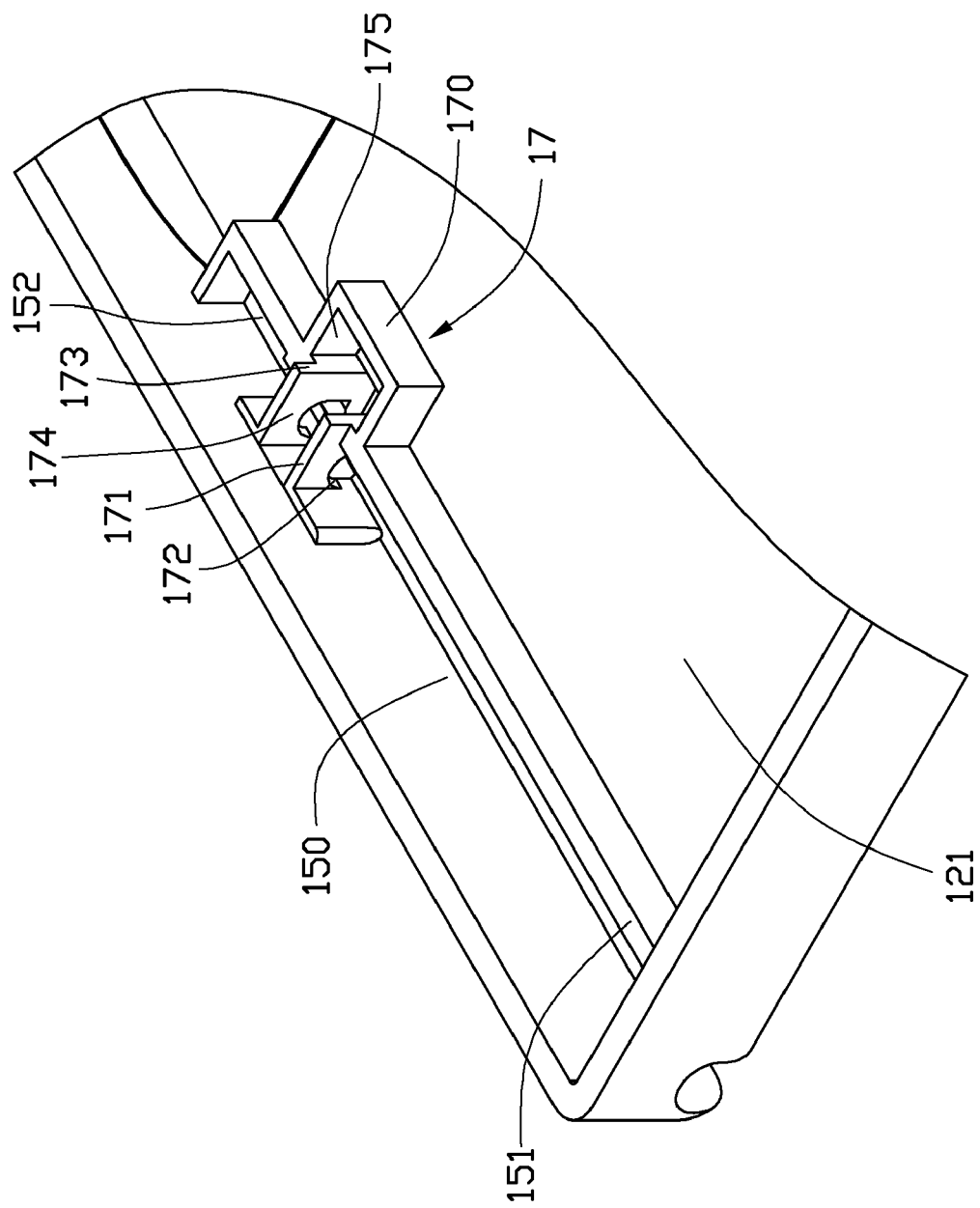
FIG. 2 is an enlarged, isometric view of the housing shown in FIG. 1.
Figure 3:
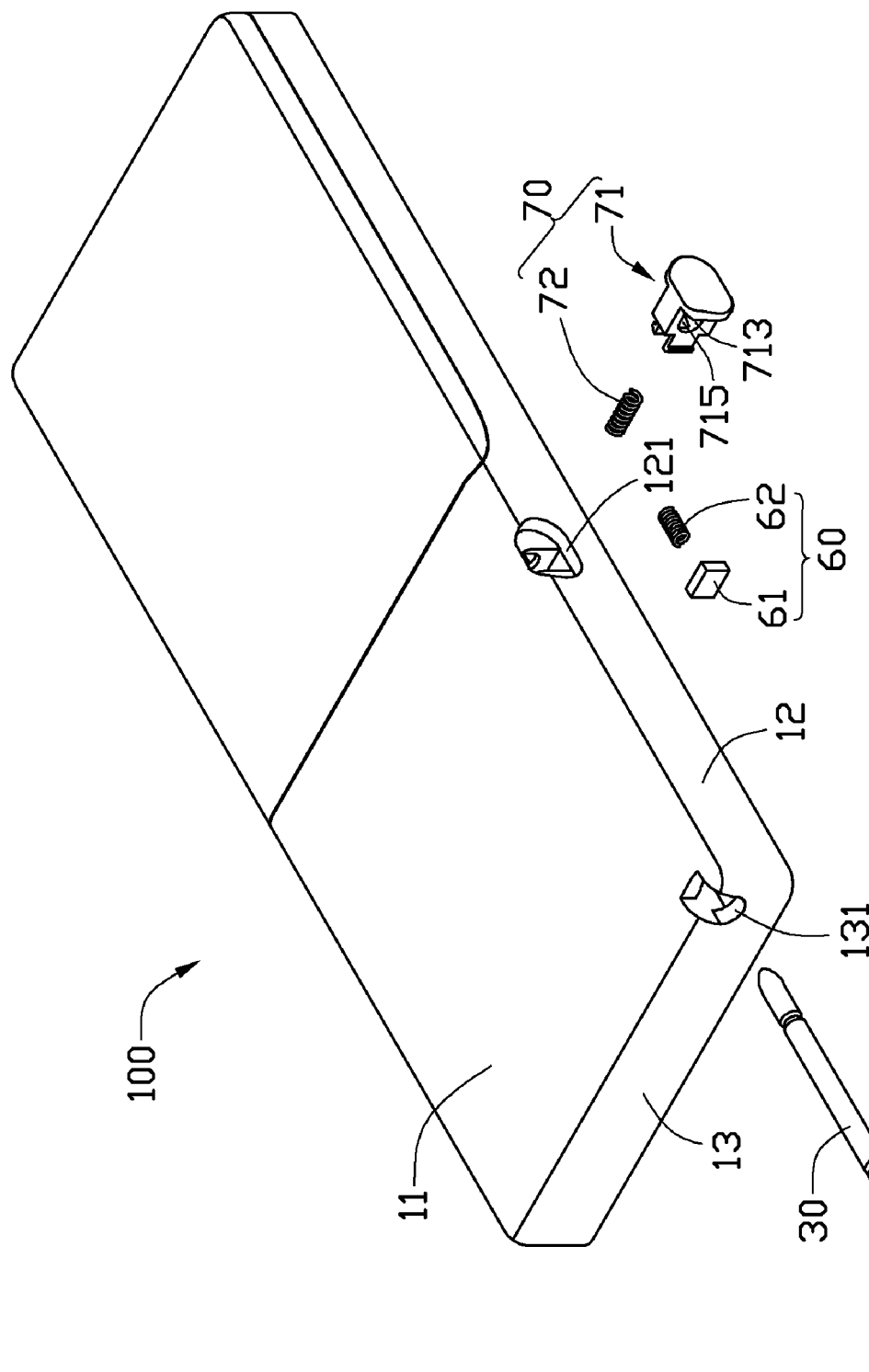
FIG. 3 is similar to FIG. 1, but viewed from another aspect.

Referring to FIGS. 2 and 3, the housing 10 includes a bottom wall 11, two opposite side walls 12 and two opposite end walls 13, thereby cooperatively defining a receiving space 121. The side wall 12 defines a button hole 121. A divisional plate 152 and a latching portion 17 are positioned in the receiving space 121. The divisional plate 152 is parallel to the side walls 12. Two ends of the divisional plate 152 are respectively intersected with one end wall 13 and one side wall 12 connected to each other, thereby defining a cavity 15. The latching portion 17 includes a protruding plate 170 and two spaced stopper plates 171. The protruding plate 170 is formed at one side of the divisional plate 151 out of the cavity 15. The protruding plate 170 is perpendicularly intersected with the divisional plate 151. The stopper plates 171 are formed at an inside of the side wall 12, and communicate with the button hole 121. The stopper plates 171 are perpendicularly intersected with the divisional plate 151. Each stopper plate 171 defines a receiving hole 172, and includes a distal end 173. The two ends of the protruding plate 170 are adjacent to the distal end 173. The two stopper plates 171 define a button space 174. The protruding plate 170 defines a slot 175. The two distal ends 173 separate the divisional plate 151, and allow the button space 174 to communicate with the slot 175. One of the stopper plate 171 with the divisional plate 151 defines a first receiving space 150, and the other of the stopper plate 171 with the divisional plate 151 defines a second receiving space 152. The second receiving space 152 is for receiving the driving mechanism 60. The housing 10 defines an insertion hole 131 for allowing the stylus 30 to be inserted.

The stylus 30 is substantially a thin and long pole. The stylus 30 is received in the cavity 15 of the housing 10. The stylus 30 defines a ring groove 31 at a peripheral wall thereof. The stylus 30 may be engaged in the receiving hole 172.

The driving mechanism 60 includes a block 61 and a driving spring 62. The block 61 and the driving spring 62 are received in the second receiving space 152 for providing an elastic force for the stylus 30.

Figure 5:
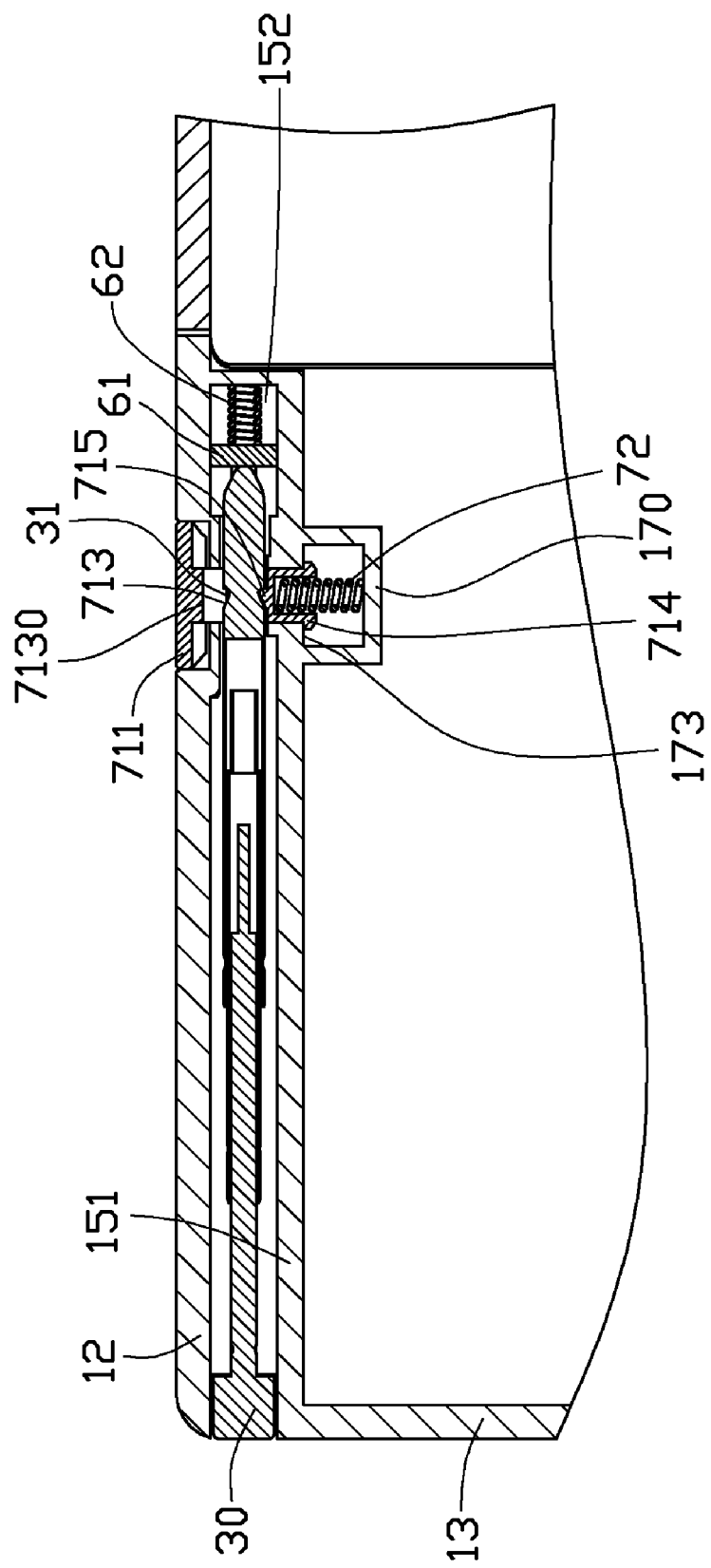
FIG. 5 is a partially cross sectional view of the exemplary stylus ejecting mechanism of FIG. 4 taken along V-V.
Figure 6:
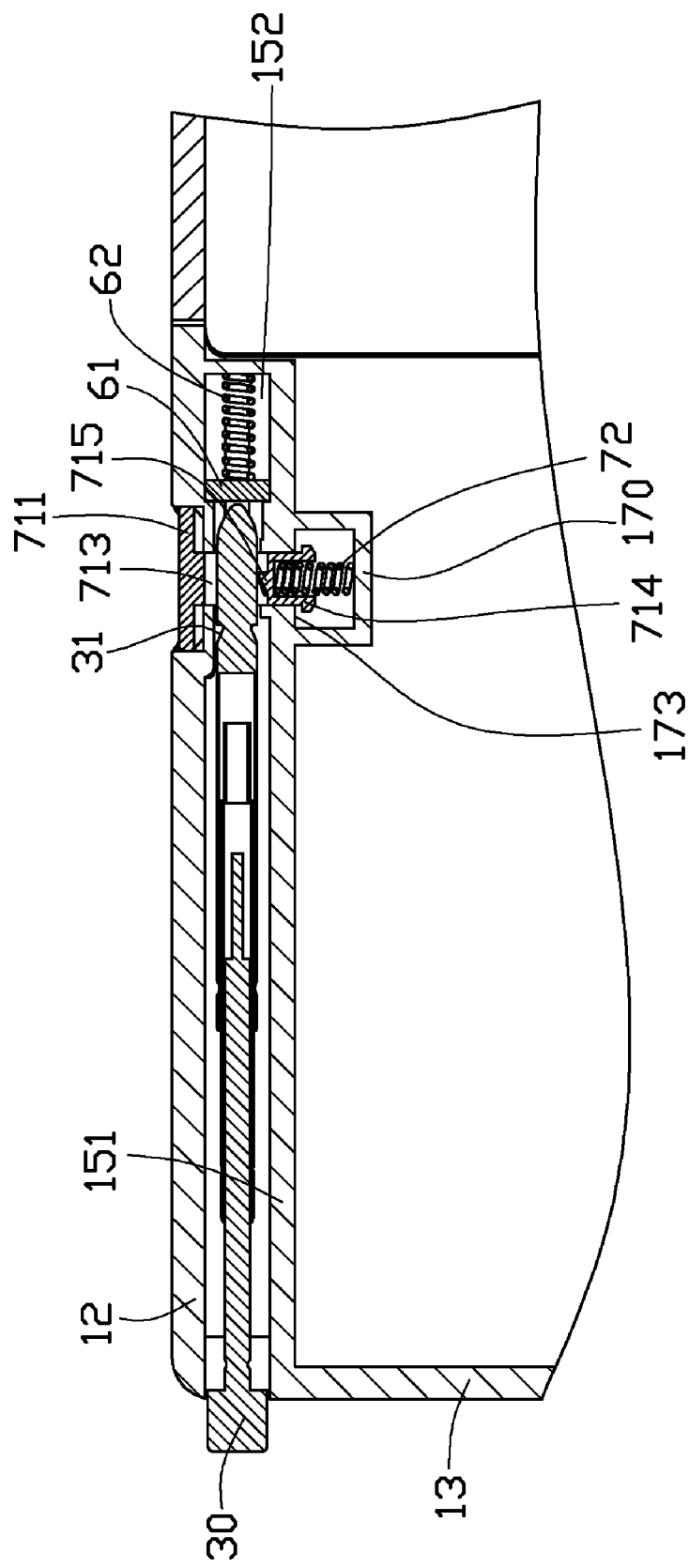
FIG. 6 is a state view showing the stylus is ejected out from the portable electronic device.

The control mechanism 70 includes a button 71 and a compressible spring 72. The button 71 includes a head portion 711, a main body 712 and two hooks 714. The head portion 711 is to be received in the button hole 121. The shape and size of the main body 712 corresponds to that of the button space 174 between the stopper plate 171. The hooks 714 extend from one end of the main body 712 far away from the head portion 711. The main body 712 has a through hole 713 defined in a peripheral wall 7130. The through hole 713 is aligned with the receiving hole 172 when the button 71 is received in the button space 174. Referring to FIG. 5, the peripheral wall 7130 forms a projection 715 adjacent to the hooks 714.

Figure 4:
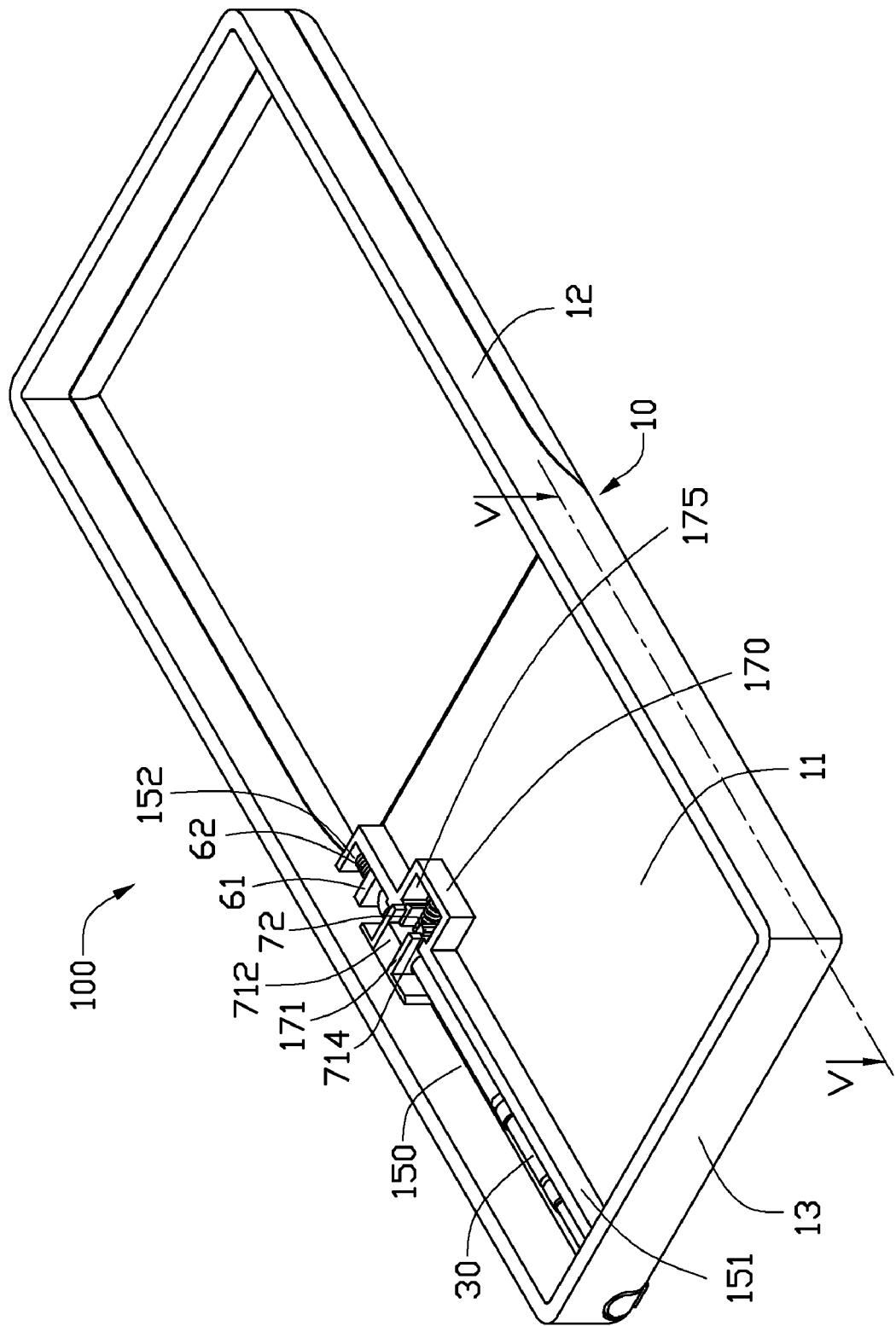
FIG. 4 is an assembled, isometric view of the exemplary stylus ejecting mechanism shown in FIG. 1.

Referring to FIGS. 4 and 5, the block 61 and the driving spring 62 is received in the second receiving space 152, and one end of the driving spring 62 abuts the divisional plate 151. Then, the compressible spring 72 is received in the slot 175. The button 71 is inserted from the button hole 121 to be received in the button space 74, and the hooks 714 latch the distal ends 173 of the stopper plates 171 for prevent the button 71 separate from the housing 10. The compressible spring 72 abuts the main body 712. Finally, the stylus 30 is assembled into the cavity 15 through the insertion hole 131. One end of the stylus 30 abuts the block 61, and the projection 715 is engaged into the ring groove 131 for latching the stylus 30 to the housing 10.

In use, the user may press the button 71. The main body 712 presses the compressible spring 72, and the projection 715 breaks away from the ring groove 31. The driving spring 62 pushes the stylus 30 to automatically eject from the cavity 15 and functions as an input device for writing, marking, or engraving on a pressure-sensitive screen of the housing 10.

It is believed that the present embodiments and their advantages will be understood from the foregoing description, and it will be apparent that different changes may be made thereto without departing from the spirit and scope of the invention or sacrificing all of its material advantages, the examples hereinbefore described merely being preferred or exemplary embodiments of the invention.

What is claimed is:

1. A stylus ejecting mechanism comprising: a housing defining a cavity and forming a latching portion; a control mechanism including a button, the button forming a projection, the button engaging with the latching portion; a driving mechanism; and a stylus received in the cavity, the stylus defining a groove, the projection being engaged in the groove for releasably locking the stylus, the driving mechanism positioned at one end of the stylus for ejecting the stylus from the cavity of the housing; wherein the housing including a divisional plate, the latching portion includes a protruding plate and two spaced stopper plates, the protruding plate and the stopper plates are respectively formed at two sides of the divisional plate; and wherein each stopper plate defines a receiving hole, and includes a distal end, the two distal ends communicate with the divisional plate, the button includes two hooks for latching the distal ends of the stopper plate.

2. The stylus ejecting mechanism of claim 1, wherein the two stopper plates defines a button space for receiving the button and communicating with a slot.

3. The stylus ejecting mechanism of claim 1, wherein the button includes a head portion and a main body, the main body defines a through hole defined by a peripheral wall, the peripheral wall forms the projection.

4. The stylus ejecting mechanism of claim 1, wherein one of the stopper plate with the divisional plate defines a first receiving space, and the other of the stopper plate with the divisional plate defines a second receiving space, the second receiving space receives the driving mechanism.

5. A portable communication device comprising: a housing defining a cavity and forming a latching portion; a control mechanism including a button, the button forming a projection, the button engaging with the latching portion; a driving mechanism; and a stylus received in the cavity, the stylus defining a groove, the projection being engaged in the groove for releasably locking the stylus, the driving mechanism positioned at one end of the stylus for ejecting the stylus from the cavity of the housing; wherein the button includes a head portion and a main body, the main body defines a through hole defined by a peripheral wall, the peripheral wall forms the projection; and wherein the button includes two hooks, the hooks extend from one end of the main body, the latching portion includes two spaced stopper plates, the hooks latch the stopper plates.

6. The portable communication device of claim 5, wherein the driving mechanism includes a block and a driving spring, the driving spring pushing the block, the block abutting the stylus.

7. The portable communication device of claim 5, wherein each stopper plate defines a receiving hole, and includes a distal end, the two distal ends communicate with the divisional plate, the two hooks latch the distal ends of the stopper plates.

* * * * *